Aug. 24, 1965     A. W. GRISWOLD     3,202,358
FLEXIBLE WATERPROOF TRACTION PAD
Filed July 25, 1961
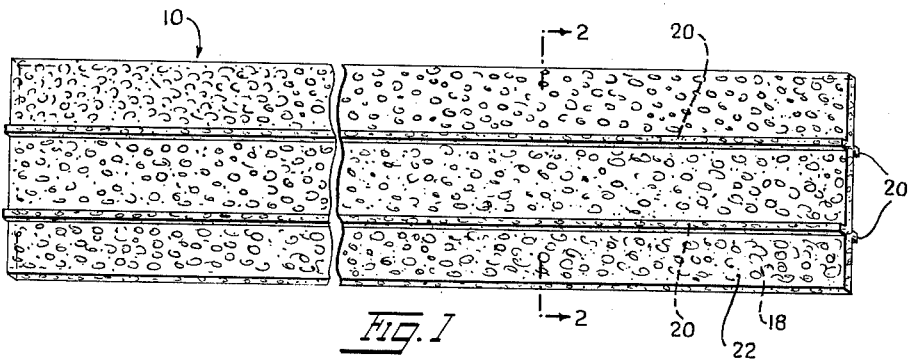
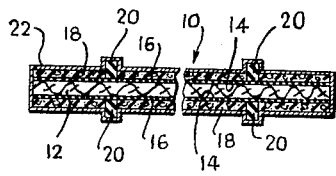
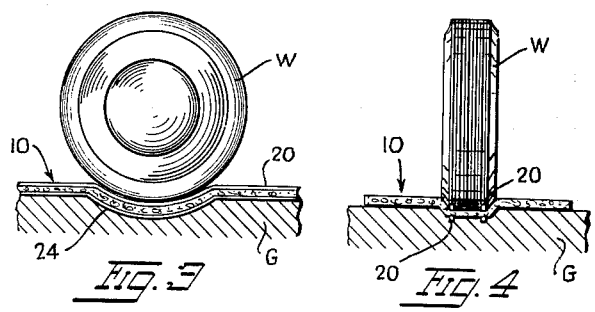
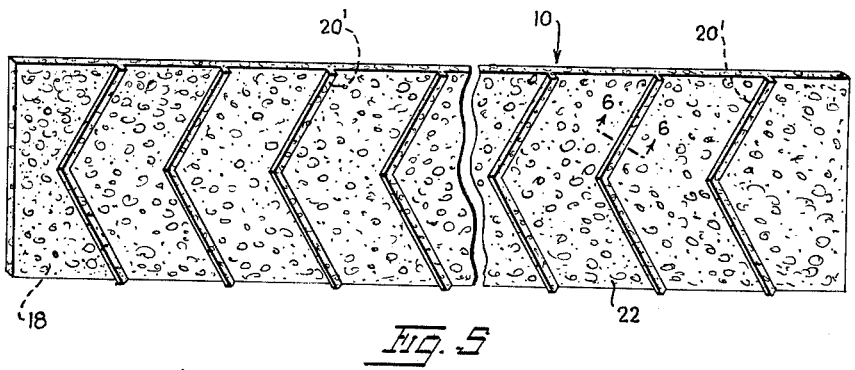
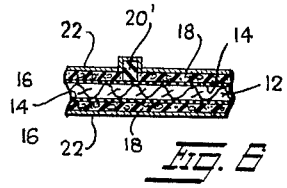
INVENTOR.
ARTHUR W. GRISWOLD
BY
*ATTORNEY*

United States Patent Office 3,202,358
Patented Aug. 24, 1965

3,202,358
FLEXIBLE WATERPROOF TRACTION PAD
Arthur W. Griswold, 508 1st Ave., Asbury Park, N.J.
Filed July 25, 1961, Ser. No. 126,714
1 Claim. (Cl. 238—14)

This invention concerns a new and improved traction pad or pad cloth especially adapted for use in putting under vehicle wheels for extricating the driving wheels of vehicles from ruts in mud, snow, sand, ice, etc.

According to the invention there is provided a sheet of rubberized cloth or of plastic coated cloth in pad form. A flexible layer of gum rubber or plastic is applied to the sheet and an abrasive such as coarse sand, emery, slag or the like is embedded in the flexible layer. A thin flexible coating of a waterproof material such as rubber-based paint, or the like is applied over the flexible layer of rubber or plastic and embedded abrasive. Both sides of the fabric are so treated to provide traction on the underside of a vehicle's wheel and on the slippery ground surface, snow, ice, etc. The pad can be formed with rubber or plastic strips to prevent side slippage.

It is therefore one object of the invention to provide a novel traction traction pad for placing under a wheel of a vehicle, employing a waterproof, flexible, fabric construction with embedded and coated abrasive on the fabric.

A further object is to provide a pad of the character described with flexible side slip preventing strips in the body of the pad.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a perspective view of a traction pad embodying the invention, parts being broken away.

FIG. 2 is a sectional view on an enlarged scale taken on the line 2—2 of FIG. 1.

FIG. 3 is a side elevational view and FIG. 4 is an end elevational view of a vehicle wheel with the traction pad of FIG. 1 shown in use therewith.

FIG. 5 is a view similar to FIG. 1 of a traction pad embodying a modified form of the invention.

FIG. 6 is an enlarged sectional view taken on the line 6—6 of FIG. 5.

Referring in detail to the drawings, in FIG. 1 a traction pad made in accordance with one form of the invention is shown and designated generally by the reference numeral 10. The pad 10 has an elongated rectangular-shaped body composed of a cloth sheet 12 coated on both sides with layers 14 of rubber or plastic. The coated sheet is covered with a coating of waterproof cement or gum 16 and embedded in this coating of cement and partially protruding outwardly thereof are sharp abrasive particles 18 of sand, slag, emery or the like, as well as a pair of plastic or rubber flexible and protruding strips 20, seating on the coated sheet and protruding slightly outwardly of the cement and abrasive particles. The strips 20 extend the length of the body of the pad and as shown in FIG. 1, each strip extends approximately within one third from the edge of the sheet. Over the cement coating and over the protruding abrasive particles and flexible strips 20 there is a waterproof coating 22 of rubber or plastic-based paint in order to bind the abrasive and to waterproof the pad. The strips 20 serve to prevent side slippage of the vehicle wheel.

By reason of this construction, the pad is flexible and foldable, strong and long wearing. The pad is economical to manufacture and can be rolled up when not in use for compact storage.

The modified form of traction pad 10' shown in FIGS. 5 and 6 differs from the pad 10 in that the slippage preventing strips 20' instead of extending longitudinally of the body are arranged in spaced V-shaped herringbone formation on one side only of the body of the pad. In all other respects, the pad 10' is similar to pad 10 and similar reference numerals are used to indicate similar parts.

The pad 10 of FIGS. 1 and 2 is shown in use in FIGS. 3 and 4. The pad is shown covering the surface of a rut 24 in the ground G. The abrasive surface of the pad grips the surface of the ground and the surface of the wheel W thereby preventing displacement of the pad and providing traction to the wheel, permitting the wheel to ride longitudinally along the pad. The flexible and protruding strips 20 prevent side slippage of the wheel during this operation. After use, the pad can be taken up and folded or rolled to compact size for storage.

The traction pad serves a useful purpose as an automobile accessory and provides emergency traction under difficult road conditions in all seasons and climates.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A traction pad comprising a sheet of plastic-treated cloth, a pair of spaced and narrow flexible strips extending longitudinally on the sheet and protruding therefrom, each strip extending approximately within one third from the edge of the sheet, a flexible first waterproof coating on both sides of the sheet, a plurality of abrasive particles distributed on both sides of the coated sheet and embedded in a flexible layer adhering to the coating, said particles partially projecting from the flexible layer, and a thin flexible coating of paint extending over the particles, the strips and the flexible layer on both sides of the pad, the first flexible waterproof coating and said flexible layer of paint being formed of rubber to bind the abrasive, and the paint coated particles forming an irregular surface on the pad.

References Cited by the Examiner

UNITED STATES PATENTS

| | | | |
|---|---|---|---|
| 1,401,689 | 12/21 | Gentry | 238—14 |
| 1,468,023 | 9/23 | Johnson | 238—14 |
| 1,650,254 | 11/27 | Zesinger | 238—14 |
| 1,815,435 | 7/31 | Harding et al. | 238—14 |
| 2,330,365 | 9/43 | Jackson | 117—29 |
| 2,428,680 | 10/47 | Piatak | 238—14 |
| 2,809,145 | 10/57 | McDermott | 154—54 |
| 2,996,150 | 8/61 | Cassem | 238—14 X |

FOREIGN PATENTS 477,213  12/27  Great Britain.

EUGENE G. BOTZ, *Primary Examiner.*

EARL M. BERGERT, LEO QUACKENBUSH,
*Examiners.*